(12) United States Patent
Blonskey et al.

(10) Patent No.: US 11,757,540 B2
(45) Date of Patent: Sep. 12, 2023

(54) REDUCING SIGNAL INTERFERENCES IN CRITICAL MISSION WIRELESS COMMUNICATION SYSTEM

(71) Applicant: CoreTigo, Ltd., Netanya (IL)

(72) Inventors: Ofer Blonskey, Even Yehoda (IL); Yaniv Yardeni, Tel-Aviv (IL); Harel Arnon, Netanya (IL)

(73) Assignee: BIONIC STORK, LTD., Tel Aviv (IL)

( * ) Notice: Subject to any disclaimer, the term of this patent is extended or adjusted under 35 U.S.C. 154(b) by 147 days.

(21) Appl. No.: 17/202,858

(22) Filed: Mar. 16, 2021

(65) Prior Publication Data

US 2021/0288412 A1 Sep. 16, 2021

Related U.S. Application Data

(60) Provisional application No. 62/990,243, filed on Mar. 16, 2020.

(51) Int. Cl.
*H04B 7/00* (2006.01)
*H04B 15/02* (2006.01)
*H04B 17/336* (2015.01)

(52) U.S. Cl.
CPC ........... *H04B 15/02* (2013.01); *H04B 17/336* (2015.01)

(58) Field of Classification Search
CPC .... H04B 15/02; H04B 17/336; H04B 17/345; H04B 15/005
See application file for complete search history.

(56) References Cited

U.S. PATENT DOCUMENTS

| | | | |
|---|---|---|---|
| 8,384,499 B2 | 2/2013 | Suzuki et al. | |
| 8,976,835 B2 | 3/2015 | Sarca et al. | |
| 9,660,698 B2 | 5/2017 | Derneryd et al. | |
| 10,784,584 B1* | 9/2020 | McNutt | G02B 6/4416 |
| 2010/0194500 A1 | 8/2010 | Suzuki et al. | |
| 2016/0112095 A1 | 4/2016 | Derneryd et al. | |
| 2019/0317181 A1 | 10/2019 | Matsumoto | |
| 2020/0358162 A1 | 11/2020 | Yang et al. | |
| 2020/0396048 A1 | 12/2020 | Moshfeghi | |
| 2021/0127452 A1* | 4/2021 | Uchida | H04W 88/06 |
| 2021/0218438 A9* | 7/2021 | Scherer | H01R 13/6675 |

* cited by examiner

*Primary Examiner* — Nhan T Le
(74) *Attorney, Agent, or Firm* — M&B IP Analysts, LLC

(57) ABSTRACT

An apparatus for a reducing signal interferences in critical mission wireless communication system is provided. The first coaxal cable having a first length and a plurality of gaps in an outer conductor of the first coaxal cable, such that a radio signal can leak out of the first coaxal cable; a plurality of receivers, wherein each receiver plurality of receivers is connected in proximity to the first coax cable; and a transmitter connected at one end of the first coaxial cable, wherein the plurality of receivers and the transmitter are part of the critical mission wireless communication system.

16 Claims, 6 Drawing Sheets

REDUCING SIGNAL INTERFERENCES IN CRITICAL MISSION WIRELESS COMMUNICATION SYSTEM

CROSS REFERENCES TO RELATED APPLICATIONS

This application claims the benefit of U.S. Provisional Application No. 62/990,243 filed on Mar. 16, 2020, the contents of which are hereby incorporated by reference.

TECHNICAL FIELD

The present disclosure relates generally to the wireless control and monitoring for a large number of devices in a confined area and, more specifically, to reducing interference in mission-critical wireless communication systems.

BACKGROUND

Industrial systems include a variety of components, including a multitude of sensors and actuators, implemented to execute various automated tasks in order to produce a desired product or carry out a specific process. Each individual industrial component should either be controlled, e.g., an actuator must be told to move a robotic arm in a particular manner, or communicated with, e.g., a sensor value reading must be received to adjust a process accordingly.

As shown in FIG. 1A, an industrial system 100 is used to direct individual connections, e.g., via cables 110, to connect a controller, such as a programmable logic controller (PLC) or Programmable Automation Controller (PAC) 115, to each component 120 of the system 100. This is a costly setup and produces many inefficiencies, as it requires a multitude of controllers, even for a single machine having multiple components. The control signal was transmitted using an analog or a digital signal sent over the individual cables 110. While simple in theory, such a setup requires high maintenance, high setup costs, and significant amounts of time spent configuring and setting up each component of the system.

Alternatively, industrial systems, as shown in FIG. 1B, include a mission critical link system 130 with a master gateway (or simply "master") 140 connected to a controller 115 and configured to communicate with multiple industrial components 160. The master 140 offers a more centralized approach, with a single master 140 connected to many components 160. The connection may be established over direct cable 150 connections. A standardized protocol, such as IO-Link®, is an example implementation of such a system.

A master 140 is configured to connect to multiple devices (e.g., devices that may operate as "slaves" in a master-star topology) 160, which may be easily connected to actuators, sensors, and the like. The sensors may include smart sensors providing valuable diagnostic information as well as updated status reports.

A wireless version of the mission-critical wireless link is provided by an emerging wireless standard, IO-Link® Wireless, which is an extension of the wired IO-Link® over a wireless medium. The IO-Link® Wireless (IOLW) specification describes a time-division multiplexing (TDM) uplink network configured to communicate with multiple devices. The master downlink is a broadcast message (i.e., one message sent to all devices) while the multiple devices and components use a synchronous (i.e., synchronized by an external clock) TDM method for uplink.

The IO-Link® Wireless allows communication over the spectrum of the industrial, scientific, and medical (ISM) band. The ISM band is a group of radio frequencies (RF) that are internationally designated for use in the industrial, scientific, and medical fields. In one such band, the channels are spaced apart by 1 megahertz (MHz) and extend from 2400-2480 MHz. Each channel may have one or more wireless transmitters transmitting over that channel. The relative amplitudes, as received by a receiver for such signals, are affected by the distance between the receiver and the transmitter, the transmitter's transmission power, and any channels placed between the two.

The ISM band provides many challenges when a reliable communication is a requirement. Specifically, in a confined area it is currently impassible to provide a reliable communication to many devices due to interferences from devices sharing the same spectrum (e.g., devices communicating over Wi-Fi, Bluetooth®, or Bluetooth Low Energy®).

Further, the IO Link Wireless (IOLW), by utilizing the ISM band, is limited in the number of devices 160 that can be supported. Supporting more devices in a confined area currently cannot be achieved using IOLW without modifications.

Therefore, implementing IOLW in a manufacturing setting, such as an assembly line or production floor, may not be an efficient solution.

FIG. 2 is an example diagram of an assembly line 200 describing the limitations of an implementation an IOLW in a confined area. The assembly line 200 includes a conveyor 210 divided into N segments (220-1 through 220-N, where N is an integer number greater than 1). In each segment a different operation is performed.

For example, an assembly line 200 may be configured for packaging bottles. In segment 220-1 liquid is poured into the bottles, in segment 220-2 bottles are sealed, in segment 220-3 labels are added, and segment 220-4 bottles are placed in a box.

Control of the various machines, robots, or like segments 220-$i$ ($i$=1, 2, 3, 4) includes a master 230-$i$ and a plurality is controller devices 240-$i$, being controlled by the respective master. That is, the master 230-1 controls the devices 240-1, but not the devices 240-2, 240-3, and 240-4 and other devices not paired with the respective master 230-1.

As each master 230 communicates with its respective devices 240 over the ISM band, interferences may occur due to communications from other masters 230 or different wireless devices 240. For example, a command sent by a master 230-1 can interfere with a command sent by a master 230-2.

As a typical assembly line and production (manufacturing) floor includes hundreds of wireless devices 240, controlled over IOLW. In an embodiment, such a link communicates over the ISM band and cannot meet the requirements of a mission-critical wireless link. Such requirements may include, as examples and without limitation, low latency, robust communication, and reliable communication.

It would, therefore, be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include an apparatus for reducing signal interferences in critical mission wireless communication system. The apparatus comprises a first coaxal cable having a first length and a plurality of gaps in an outer conductor of the first coaxal cable, such that a radio signal can leak out of the first coaxal cable; a plurality of receivers, wherein each receiver plurality of receivers is connected in proximity to the first coax cable; and a transmitter connected at one end of the first coaxal cable, wherein the plurality of receivers and the transmitter are part of the critical mission wireless communication system.

Certain embodiments disclosed herein also include a system comprising: a plurality for sectors, wherein each sector is installed with an apparatus for reducing signal interferences resulted from critical mission wireless communications, wherein each apparatus includes: a first coaxal cable having a first length and a plurality of gaps in the outer conductor of the first coaxal cable, such that a radio signal can leak out of the coaxal cable; a plurality of receivers, wherein each receiver plurality of receivers is connected in proximity to the first coax cable; and a transmitter connected at one end of the first coaxal cable, wherein the plurality of receivers and the transmitter are part of a critical mission wireless communication system.

Certain embodiments disclosed herein also include an apparatus for reducing signal interferences in critical mission wireless communication system. The apparatus includes a coaxal cable design to allow a radio signal to leak along a full length of the coaxal cable; a plurality of receivers, wherein each receiver includes a near field radio frequency (RF) probe, thereby allowing a near field communication between the receiver and the coaxal cable; and a transmitter connected at one end of the coaxal cable, wherein the plurality of receivers and the transmitter are part of the critical mission wireless communication system.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
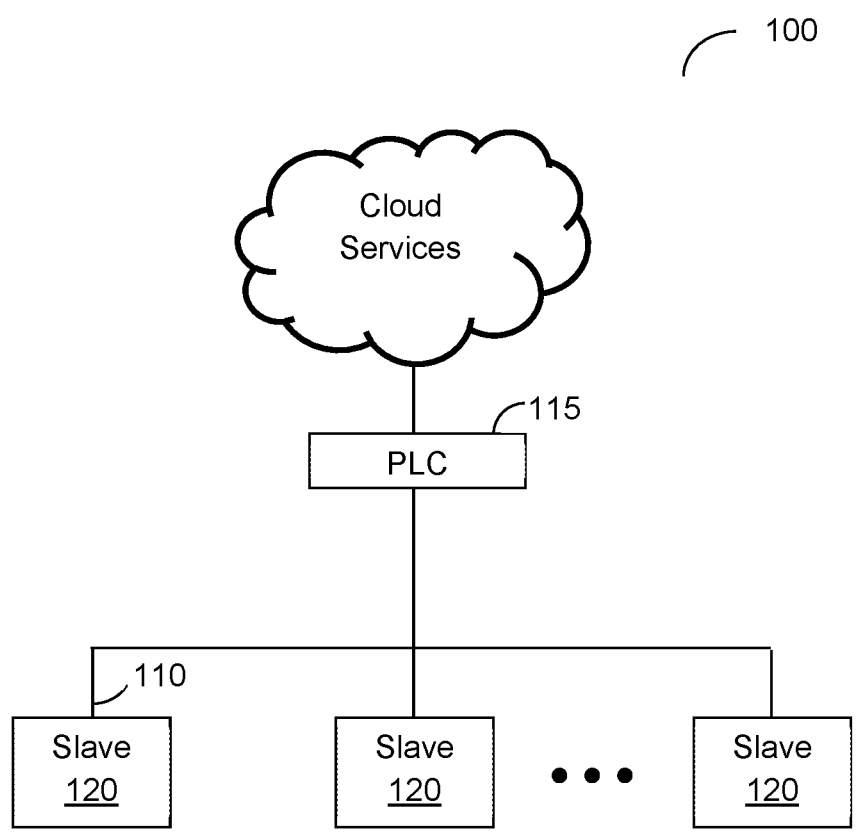
FIGS. 1A and 1B are diagrams illustrating the control of industrial components.
Figure 1B:
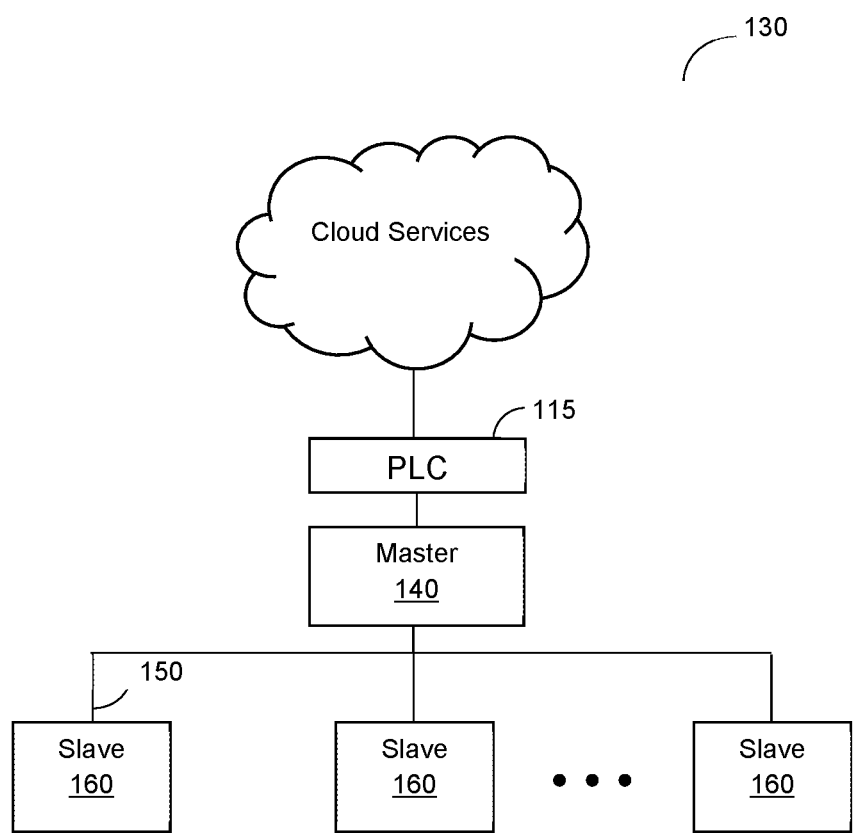

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural, and vice versa, with no loss of generality. In the drawings, like numerals refer to like parts through several views.

The example disclosed embodiments allow for elimination of interferences and meet the requirements of a critical mission wireless link (CMWL) using a leaky coax cable or waveguide. Specifically, the disclosed embodiments are utilized to provide a reliable CMWL in, for example, a production floor where robots or a tracking system requires a real time control. A tracking system is a linear motor system that allows for independent control of multiple movers on straight or curvilinear paths. In such configuration, one or more of the devices are mobile, for example, moving on a linear (1D) path (or track). The leaky cable is fixed to this path and the device RF probes keep proximity to the leaky cable whenever communication is required.

A leaky coax cable (feeder) is a cable designed to radiate energy, thus functioning as an extended antenna. The cable is "leaky" as it has gaps or slots in its outer conductor to allow the radio signal to leak into, or out of, the cable along its entire length. Because of "leakage" of signal, line amplifiers may be required when the cable is too long (e.g., over 300 meters).

Figure 3:
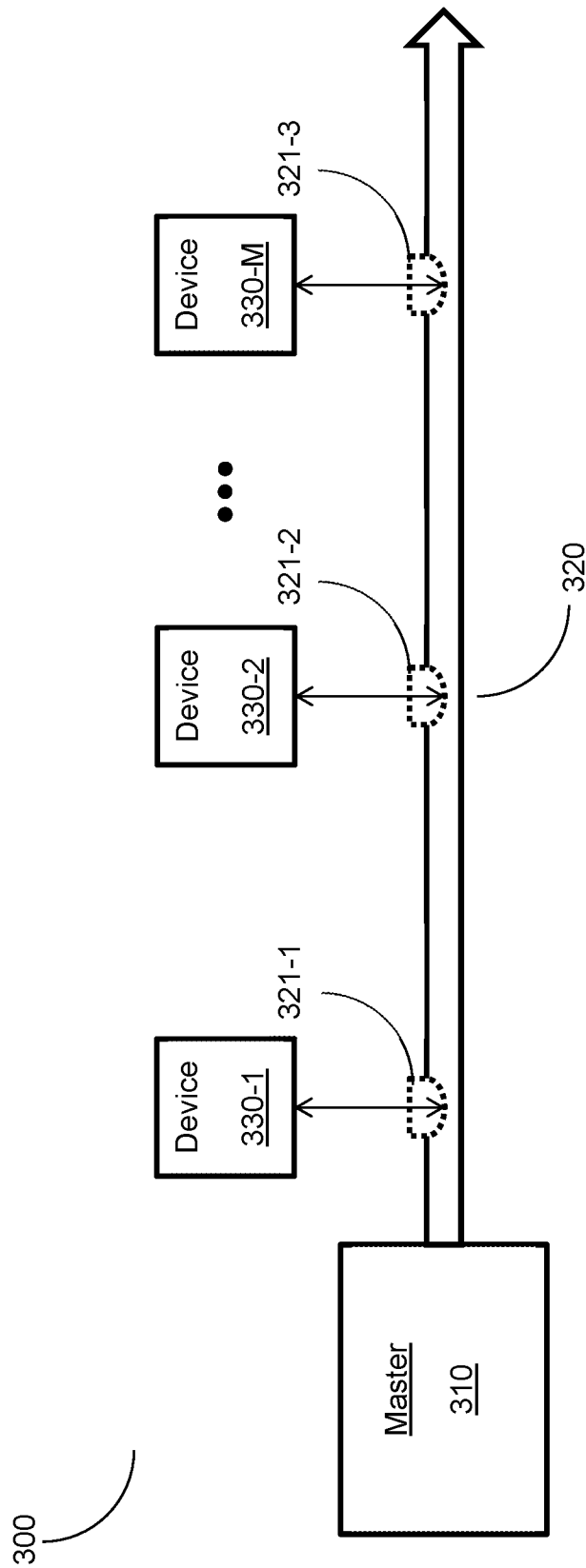
FIG. 3 is a diagram illustrating the deployment of a critical mission wireless link (CMWL) system, according to an embodiment.

FIG. 3 is an example diagram illustrating the deployment an apparatus for reducing interfaces signals in critical mission wireless link (CMWL) system 300 according to an embodiment. In the system 300, a master device (or simply "master") 310 is connected to a leaky coax cable (or simply "the cable") 320. The cable 320 has gaps 321-1 through 321-M in about the locations of slave devices ("devices") 330-1 through 330-M (M is an integer greater than 1). In an example embodiment, a master 310 can support about 40 devices.

In an embodiment, the number of gaps 321 is also M to corresponds to the number of slave devices. The length of the cable 320 may be predetermined. A device 330 is placed in a proximity to a respective gap. A gap 321 is a "cut" in the cable's 320 outer conductor, such that a radio signal may or can leak into, or out of, the cable along its entire length. It should be noted that a gap 321 is only one configuration to allow leakage of energy outside of the cable. In another embodiment, the cable 320 may be designed without any gaps, where energy can leak out of the cable along the full length of the cable to allow continuous communication. Such cables are commercially available, where the devices are designed to allow near field communication to reduce any interfaces.

In another embodiment, an antenna of a device 330 may be designed to allow only near field communication, using for example a near field RF probe. The RF probe is positioned at a distance between 0.5 and 10 cm from the center of the coax cable. An example for such a probe is an exposed pin of a coax cable. According to some embodiments, the cable 320 can be replaced by a leaky waveguide.

In an optional embodiment, each device 330-$i$, where "i" is an integer greater than 1 and less than "M," may be encapsulated in a partition (not shown) utilized to balance the power levels between sectors. Such a partition can be made of any radiation blocking materials and is disposed around the device's antenna.

The CMWL, as an example embodiment, is an IO-Link® Wireless defined in IO-Link® Wireless System Specification, first version published in March 2018. In yet another embodiment, the CMWL may be configured for wireless communication standards, such as BLE®, Zigbee®, and the like.

The deployment illustrated in FIG. 3 is of a single sector in, for example, a production floor, an assembly line, and the like. However, a typical deployment includes a number of sectors. According to an embodiment, each such sector may be deployed as shown in FIG. 3. The disclosed embodiments are aimed at maximining the near field gain (between a device and master), while minimizing the far field gain. In an embodiment, the distance between two adjacent sectors is determined so that the far field gain is minimized to eliminate interferences between two sectors.

It should be noted that a master 310 may be realized as a RF transceiver. Each (slave) device 330 may be realized as a RF receiver. Such RF transceiver and receiver may be configured to transmit and receive RF signal according to a wireless communication standard.

Figure 4:
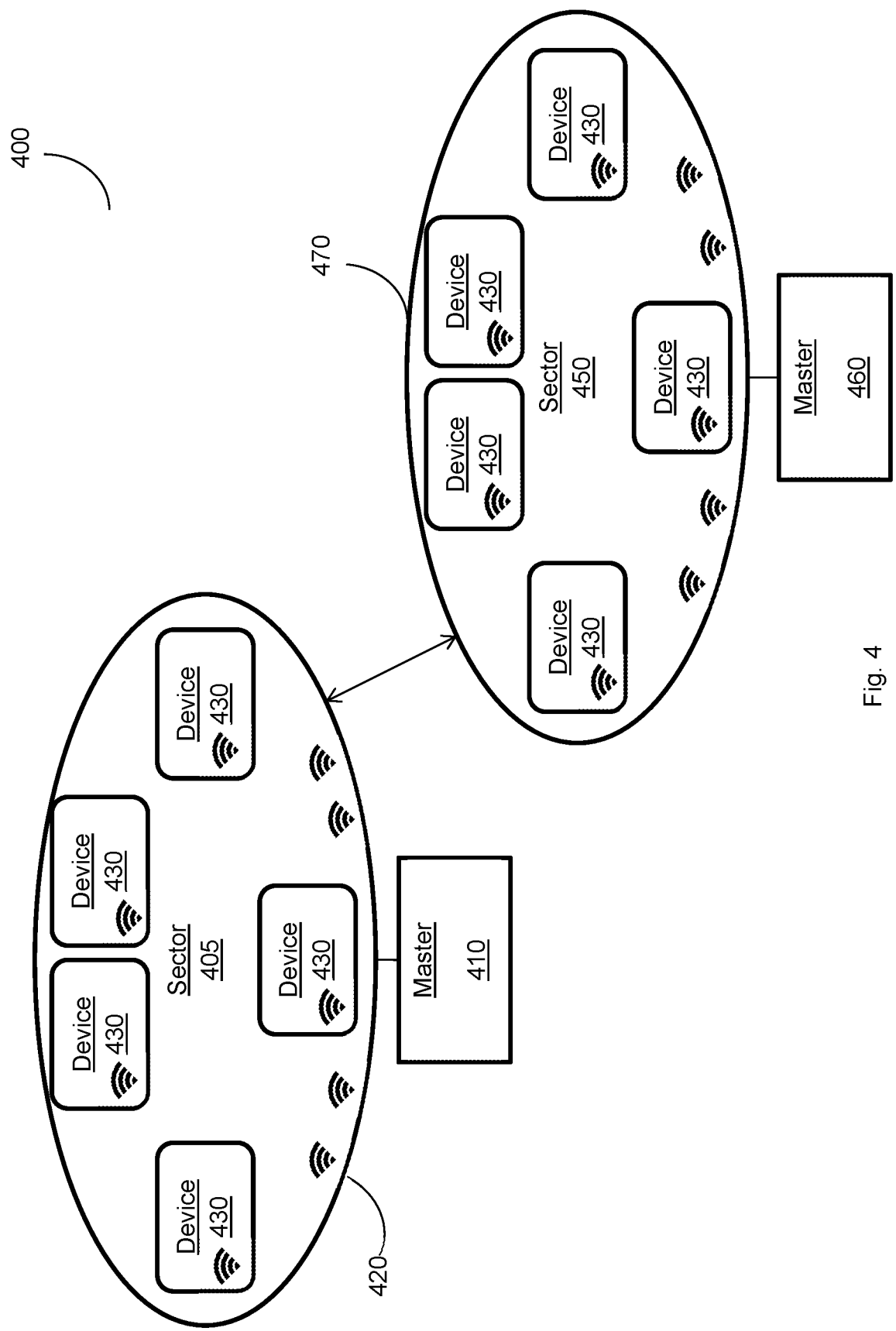
FIG. 4 is a diagram illustrating the deployment of a production floor, including a plurality of sectors arranged according to the disclosed embodiments.

FIG. 4 is an example diagram illustrating the deployment of a production floor 400, including a plurality of sectors, arranged according to the disclosed embodiments. As shown in FIG. 4, a sector 405 includes a master device 410 connected to a cable 420 and devices 430. A sector 450 includes a master device 460 connected to a cable 470 and devices 480. Each of the cables 420 and 470 is a leaky coax cable.

In order to prevent interferences between the sectors 405 and 450, the distance between the sectors 405 and 450 may be predetermined. In an embodiment, the distance is determined based on the antenna gain of each device, the coupling loss of the cables, and the required signal to noise ratio (SNR). These values may be defined values or computed values.

The space path loss for a distance 'd' [meters] and frequency 'f' [MHz] is determined as follows:

$$FSPL(dB) = 20 \log d + 20 \log f - 27.55 - G1 - G2; \quad \text{Eq. 1}$$

The radiated cable coupling loss (CP/L(d)) for a distance (d) is computed as follows:

$$CP \cdot L\ XX\ \%\ (d) = CP \cdot L\ XX\ \% + 20 \log \frac{d}{2}; \quad \text{Eq. 2}$$

where the radiated cable coupling loss is CP.L 50% to account for the worst case. This value is provided by the cable manufacturer. The path loss between a device in a first sector and an interfering device in a second sector $P_{D1,D2}$ is computed in Eq. 3.

$$P_{D1,D2}[dBm] = P_{D2,Tx} + G_{D1,iso} + G_{D2,iso} - FSPL(d,f); \quad \text{Eq. 3}$$

In Eq. 3, each of $G_{D1,iso}$ and $G_{D2,iso}$ is the antenna gain in isolation for two different devices in adjacent sectors. This represents the evaluated "undesired gain" in the direction of the interfering sector.

The path loss $P_{D1,M2}$ between a device in a first sector and a master in a second sector is computed as in Eq. 4:

$$P_{D1,M2}[dBm] = CP \cdot L\ 50\% + 20 \log \frac{d}{2}; \quad \text{Eq. 4}$$

The same can be utilized to path loss $P_{D1,D2}$ between a device in a first sector and a device in a second sector. The deployment of the CMWL should meet a required SNR, set as the target SNR level. For example, target SNR level for IOLW should meet PER level of PER≤10⁻⁹.

The SNR margin is defined as the power level in dB above the sensitivity level for the "required SNR," and computed based on the power loss between devices and between a master and a device. In an embodiment, the margin SNR for the device and for the master are computed in Eq. 5 and Eq. 6, respectively.

$$SNR_{margin}[dB] = \frac{P_{D1,M1}[W]}{N_{KTB}[W] + P_{D1,D2}[W] + P_{D1,M2}[W]}[dB] - SNR_{required}[dB]; \quad \text{Eq. 5}$$

$$SNR_{margin,M1}[dB] = \frac{P_{M1D1}[W]}{N_{KTB}[W] + \max(P_{M1,D2}[W], P_{M1,M2}[W])}[dB] - SNR_{required}[dB]; \quad \text{Eq. 6}$$

As the $SNR_{margin}$ is a function of the power loss between a device and a master, and as this value is a function of the distance between a device and a master (and, hence, between the sectors), changing the distance would change the SNR values.

Figure 2:
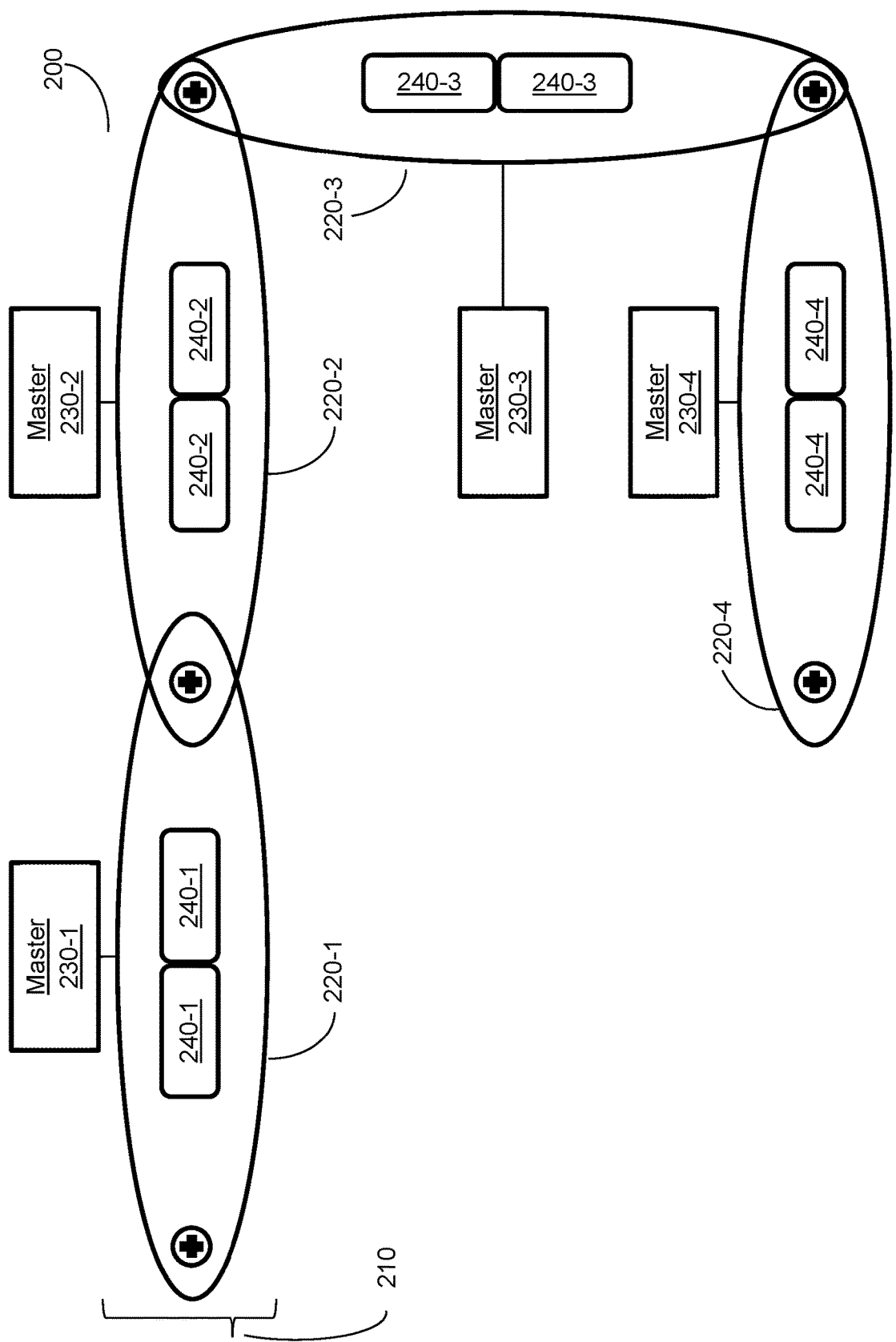
FIG. 2 is a diagram of an assembly line describing the limitation of implementing an IOLW in a confined area.

It should be noted that only 2 sectors are shown in FIG. 2 merely for ease of discussion. The embodiments disclosed herein are applicable in a production floor, an assembly line, and like applications which include multiples sectors, and typically more than 2 sectors.

It should be noted that the embodiments discuss herein with reference to master-devices topology is just one example topology where the disclosed embodiments are applicable. For example, the leaky cable or waveguide deployment, disclosed herein, can be application in systems utilizing mesh topology, star topology, and the like. It should be further noted that the master may be realized as a transceiver (as shown in FIG. 5) and a slave may be realized as a receiver to support topologies other than a master-slave topology.

Figure 5:
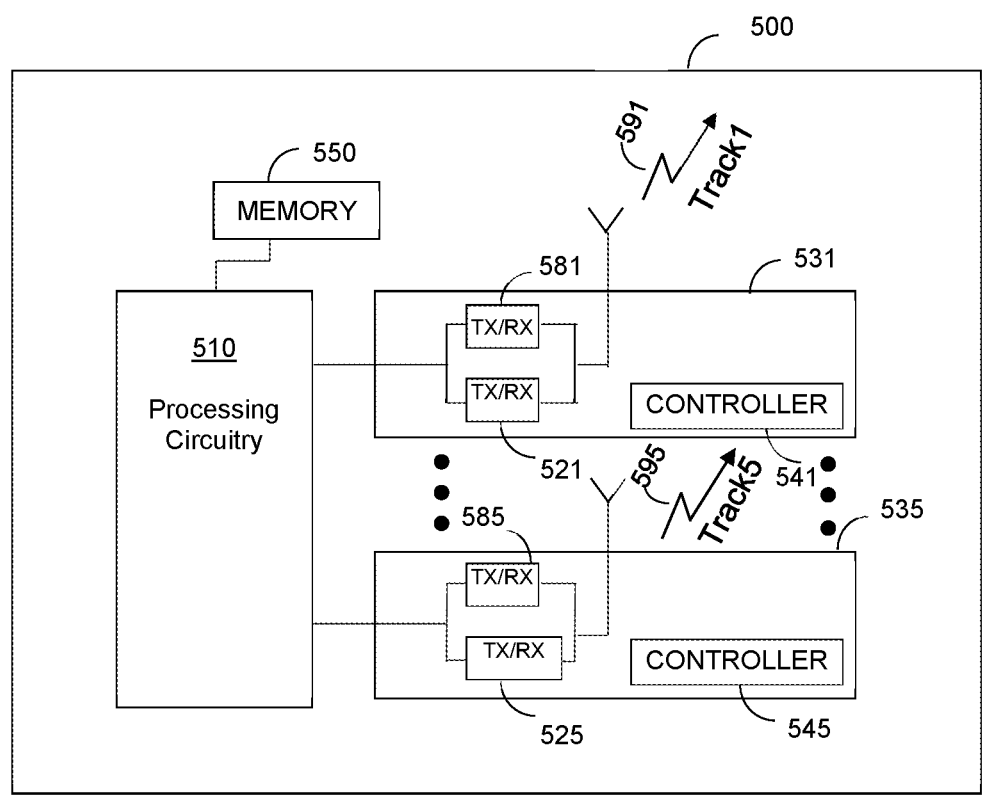
FIG. 5 is a block diagram of a master operable in a CMWL according to an embodiment.

FIG. 5 is an example diagram of a master gateway (or simply "master") in accordance with an embodiment. The master 500 is operable in a critical mission wireless communication system. In a preferred embodiment, the master 500 is operable in accordance with the IO-Link® Wireless standard as defined in "IO-Link® Wireless System Specification", first version published in March 2018. The master 500 includes a processing circuitry 510, a plurality of transceivers 531 through 535, and a memory 550. The master 500 is configured to communicate over multiple tracks 591 through 595 with a single transceiver 531 through 535 dedicated to each track. Each transceiver 531 through 535 contains a single transmitter 581 through 585, a single receiver 521 through 525 and a single synchronous modem controller 541 through 545. Each transceiver 531 through 535 also includes a single radio. In an example embodiment, each transceiver 531 through 535 is configured to receive and transmit wherein the at least receiver one of the plurality of receivers is configured to receive, for example, a GFSK modulated signal.

It should be noted that while five transceivers are shown in the example implementation of FIG. 5, this is by no means meant to limit the number of transceivers possible to be implemented in the current disclosure, and is merely used as a non-limiting example.

The processing circuitry 510 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, and the like, or any other hardware logic components that can perform calculations or other manipulations of information.

The memory 550 may be volatile (e.g., RAM, etc.), non-volatile (e.g., ROM, flash memory, etc.), or a combination thereof. In one configuration, computer readable instructions to implement one or more embodiments disclosed herein may be stored in the memory 550.

In another embodiment, the memory 550 is configured to store software. Software shall be construed broadly to mean any type of instructions, whether referred to as software, firmware, middleware, microcode, hardware description language, or the like. Instructions may include code (e.g., in source code format, binary code format, executable code format, or any other suitable format of code). The instructions, when executed by the one or more processors, cause the processing circuitry 510 to perform the various processes described herein.

According to an embodiment, the master 500 wirelessly communicates with a plurality of devices (not shown) through tracks 591 through 595 using transceivers 531 through 535, respectively. The timing synchronization of transceivers 531 through 535 with the devices (not shown in FIG. 5) is controlled by synchronous modem controllers 541 through 545. That is, devices are synchronized to transceivers 531 through 535 using controllers 541 through 545 over the multicast downlink. The transceivers 531 through 535 within the master are all synchronized to the same circuit trigger (e.g., a strobe on each sub-cycle) using the processing circuitry 510. As demonstrated herein, the architecture of master 500 is based on a single receiver per transceiver and track, thereby simplifying the implementation and making it significantly more cost effective.

An example of a master 500 is discussed in further detail in U.S. patent application Ser. No. 16/446,004, filed Jun. 19, 2019 assigned to common assignee, and incorporated herein by reference.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. An apparatus for reducing signal interferences in critical mission wireless communication system, comprising:
   a first coaxal cable having a first length and a plurality of gaps in an outer conductor of the first coaxal cable, such that a radio signal can leak out of the first coaxal cable;
   a plurality of receivers, wherein each receiver plurality of receivers is connected in proximity to the first coax cable;
   a transmitter connected at one end of the first coaxal cable, wherein the plurality of receivers and the transmitter are part of the critical mission wireless communication system; and
   a second coaxal cable having a second length and a plurality of gaps a plurality of gaps in the outer conductor of the second coaxal cable;
   wherein the first coaxal cable, the plurality of receivers, and the transmitter are deployed in a first sector including only one sector of a production line.

2. The apparatus of claim 1, wherein each of the plurality of receivers includes a near field radio frequency (RF) probe to allow a near field communication.

3. The apparatus of claim 1, wherein the critical mission wireless communication system operates according to a wireless communication standard.

4. The apparatus of claim 3, wherein the wireless communication standard is the IO-Link Wireless standard.

5. The apparatus of claim 4, wherein the wireless communication standard is the Bluetooth Low Energy (BLE) standard.

6. The apparatus of claim 1, wherein the second coaxal cable is connected to a second sector of the production line.

7. The apparatus of claim 6, wherein the first sector and the second sector are placed in a predetermined distance from each other.

8. The apparatus of claim 7, wherein the distance is determined based on an antenna gain of each slave device, coupling loss of each of the first and second coaxal cable, and a required signal to noise ratio (SNR).

9. The apparatus of claim 1, wherein the critical mission wireless communication system operates in a master-slave star topology and wherein each of the plurality receivers is a slave device and wherein the transmitter is a master device.

10. The apparatus of claim 9, wherein each of the master device and the slave device is a transceiver.

11. A system comprising:
a plurality for sectors, wherein each sector is installed with an apparatus for reducing signal interferences resulted from critical mission wireless communications, wherein each apparatus includes:
a first coaxal cable having a first length and a plurality of gaps in the outer conductor of the first coaxal cable, such that a radio signal can leak out of the coaxal cable;
a plurality of receivers, wherein each receiver plurality of receivers is connected in proximity to the first coax cable;
a transmitter connected at one end of the first coaxal cable, wherein the plurality of receivers and the transmitter are part of a critical mission wireless communication system; and
a second coaxal cable designed to allow a radio signal to leak along a full length of the coaxal cable, and wherein at least one receiver of the plurality of receivers includes a near field radio frequency (RF) probe, thereby allowing a near field communication between the receiver and the coaxal cable;
wherein the least one receiver of the plurality of receivers is configured to move along the length of the second coaxal cable.

12. The system of claim 11, wherein the system is deployed in any one of: a production line and an assembly line.

13. The system of claim 12, wherein the critical mission wireless communication system operates according to a wireless communication standard.

14. The system of claim 11, wherein the plurality of sectors is arranged in any one of: a mesh topology, a master-slave topology, and a start topology.

15. The system of claim 11, wherein the critical mission wireless communication system operates in a master-slave star topology and wherein each of the plurality receivers is a slave device and wherein the transmitter is a master device.

16. The system of claim 15, wherein each of the master device and the slave device is a transceiver.

\* \* \* \* \*